United States Patent [19]

Sauermann

[11] Patent Number: 4,533,898
[45] Date of Patent: Aug. 6, 1985

[54] SYMMETRICAL TEMPERATURE SENSOR

[75] Inventor: Heinz Sauermann, Halstenbek, Fed. Rep. of Germany

[73] Assignee: U.S. Philips Corporation, New York, N.Y.

[21] Appl. No.: 558,412

[22] Filed: Dec. 5, 1983

[30] Foreign Application Priority Data

Dec. 7, 1982 [DE] Fed. Rep. of Germany ....... 3245178

[51] Int. Cl.$^3$ .......................... G01K 7/22; H01C 7/08; H01L 37/00
[52] U.S. Cl. ................................. 338/25; 338/22 SD; 357/28; 374/178
[58] Field of Search .................. 338/22 R, 22 SD, 25; 357/28; 374/178

[56] References Cited

U.S. PATENT DOCUMENTS

| 2,953,759 | 9/1960 | Lehovec | 338/22 SD |
| 3,582,830 | 6/1971 | Pultorak et al. | 357/30 X |
| 3,936,789 | 2/1976 | Matzen et al. | 338/22 SD |
| 4,047,436 | 9/1977 | Bernard et al. | 374/178 X |

FOREIGN PATENT DOCUMENTS

| 28387 | 5/1981 | European Pat. Off. | 357/28 |
| 61550 | 10/1982 | European Pat. Off. | 338/22 R |
| 3010718 | 9/1981 | Fed. Rep. of Germany | 374/178 |

Primary Examiner—Roy N. Envall, Jr.
Assistant Examiner—C. N. Sears
Attorney, Agent, or Firm—Robert T. Mayer; Steven R. Biren

[57] ABSTRACT

An electrically symmetrical temperature sensor includes two highly doped zones which are formed in a semiconductor body of one conductivity type, which are provided with connection contacts, and have the same conductivity type as that of the body. A temperature-dependent resistor is formed between the two highly doped zones. In order to avoid mechanical strains due to the temperature differences which occur during operation and which invalidate the resistance value, and in order to be able to incorporate the semiconductor body without great difficulty in simply-constructed envelopes, in particular in glass envelopes of the type frequently used for rectifier diodes, the zones of the same conductivity type are located opposite each other on opposite sides of the semiconductor body. Further, the semiconductor body comprises neutron-transmuted n-type silicon.

3 Claims, 2 Drawing Figures

SYMMETRICAL TEMPERATURE SENSOR

BACKGROUND OF THE INVENTION

The invention relates to an electrically symmetrical temperature sensor comprising two highly doped zones which are formed in a semiconductor body of one conductivity type, which are provided with connection contacts which zones are of the same conductivity type and between which a temperature-dependent resistor is formed.

A temperature sensor of this kind is known from EP-OS No. 0028 387. In this temperature sensor, however, the connection contacts are both located on the same side of the semiconductor body in order that the spreading resistance principle can be utilized. However, this has the disadvantage that during operation mechanical strains due to the occurring temperature differences can be produced, which invalidate the resistance value, and that the incorporation in the semiconductor body of such a temperature sensor in a package can be realized only by means of techniques generally used for planar semiconductor elements.

SUMMARY OF THE INVENTION

Therefore, the invention has for its object to construct a symmetrical temperature sensor of the aforementioned kind so that the constancy of the resistance is improved and the said body can be readily incorporated in other packages, in particular in glass envelopes, as are generally used for rectifier diodes.

The invention is based on the recognition of the fact that the principle of the spreading resistance can be dispensed with and that solely the temperature dependence of the mobility of the charge carriers in a semiconductor body can be utilized.

According to the invention, this object is achieved in that the zones of the same conductivity type are located opposite each other on opposite sides of the semiconductor body.

Such a temperature sensor, which is symmetrical not only in electrical respect, but also as to its shape, can now be incorporated without difficulty in the glass envelopes generally used for diodes.

Further advantages are that owing to the mechanically symmetrical construction, smaller mechanical strains occur and thus the constancy of the resistance is better, and that larger contact zones and hence a higher current load capacity can be obtained.

BRIEF DESCRIPTION OF THE DRAWING

An embodiment of the invention is described more fully with reference to the accompanying drawings. In the drawings.

DESCRIPTION OF THE PREFERRED EMBODIMENTS

Figure 1:
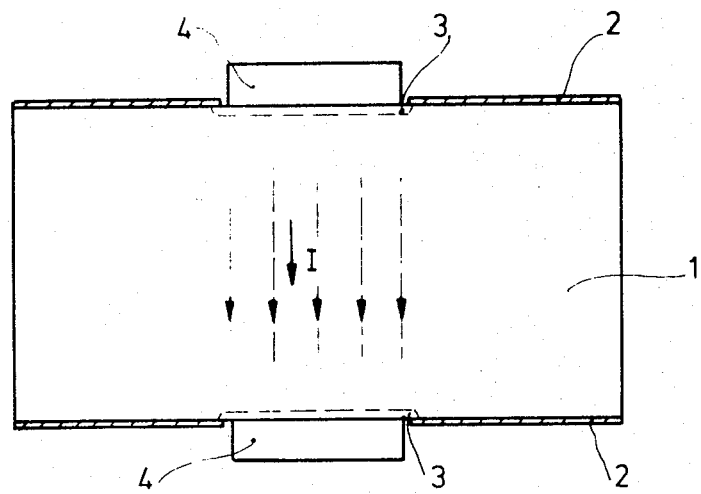
FIG. 1 shows diagrammatically the construction of a symmetrical temperature sensor without a housing.

FIG. 1 shows (not to scale) a semiconductor body 1 having a thickness d, the upper side and the lower side of which are coated with a protection or masking layer 2. The two layers are provided with windows, below each of which there is located in the semiconductor body 1 of one conductivity type a highly doped zone 3 of the same conductivity type. Both zones 3 have connection contacts 4 of metal.

In a symmetrical temperature sensor of this construction, a direct voltage between the two connection contacts 4 produces a current I, the value of which is independent of the polarity of the applied voltage. A resistor R is then formed between the two connection contacts (without taking parasitic effects into account) of:

$$R = \frac{4(d - 2d_K)S}{(D + 2d_K)^2} = \frac{4(d - 2d_K)}{(D + 2d_K)^2 \pi \cdot e \cdot \mu \cdot N}$$

where:
D = diameter of the zones 3
d = thickness of the semiconductor body 1
$d_K$ = depth of the zones 3
N = doping concentration in the zones 3
e = elementary charge
S = resistivity of the semiconductor body 1
$\mu$ = charge carrier mobility.

In this equation, in the standard temperature measurement range of −55° C. to +155° C. for a temperature sensor of silicon, only the mobility $\mu$ is dependent upon the temperature.

A symmetrical temperature sensor thus constructed can be manufactured in the following manner: In order to obtain the largest possible temperature dependence of the mobility, the starting material chosen for the semiconductor body is N-silicon having a resistivity of S=7Ω cm. In order to have a minimum parasitic effect, neutron-transmitted silicon is chosen. The semiconductor body has a thickness d of 310 $\mu$m. The semiconductor wafer, polished or etched on both sides, is first covered on the front side and on the back side with a diffusion mask 2 of $SiO_2$ or $Si_3N_4$. In this mask, (circular) windows having a diameter D are then etched by means of a double-sided photolithographic process into the masking layer 2 so that they are located opposite each other. Highly doped zones 3 are subsequently provided through the windows in the semiconductor body by means of contact diffusion with phosphorus down to a depth $d_K$. If, for example, the whole diameter D in the masking layers 2 is 160 $\mu$m and if the diffusion depth $d_K$ of the zones 3 is 3 $\mu$m, a resistor R of 1000 Ω is obtained at 25° C. with the aforementioned values for the semiconductor body. The doping concentration in the zones 3 is at least $10^{19}$ atoms/cm$^3$.

Subsequently, the zones 3 are provided with connection contacts 4 of, for example, titanium/silver. The height of these contacts is, for example, 35 $\mu$m.

In order to avoid as far as possible the occurrence of mechanical strains and resistance variations connected therewith, it is efficacious to choose the diameter of the connection contacts to be smaller than the diameter of the windows in the masking layers 2 and, as the case may be, to remove the masking layers.

The semiconductor wafer is finally subdivided into separate chips of 0.5×0.5 mm$^2$. With such a chip size, with which the longitudinal dimensions are large with respect to the diameter of the zones 3, the current transport takes place substantially only in the interior of the crystal, while surface effects, which could also exert influence on the stability of the temperature sensor, are excluded.

Figure 2:
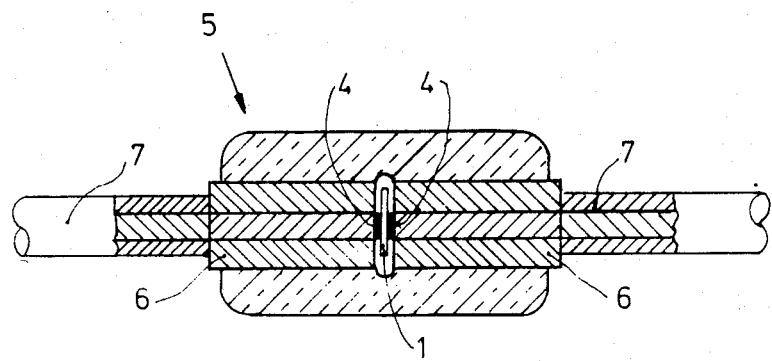
FIG. 2 shows a temperature sensor of the kind shown in FIG. 1 incorporated in a glass housing.

FIG. 2 shows a semiconductor body thus manufactured and incorporated in a glass housing (standard diode housing DO-34). The semiconductor body 1 with its two connection contacts 4 is located between two contact bodies 6, which are provided with connection wires 7, which consist of Cu with a core of Fe and which are surrounded by an envelope of soft glass shown above and below the contact bodies 6. A temperature sensor with such an envelope is also very suitable for measuring higher temperatures.

What is claimed is:

1. A symmetrical temperature sensor, which comprises:
    a semiconductor body of one conductivity type comprising neutron-transmuted n-type silicon;
    two highly-doped zones of said conductivity type and formed opposite each other on opposite surfaces of said semiconductor body, the thickness of said zones being substantially less than that of said semiconductor body, a temperature-dependent resistor being formed in said body between said two zones; and
    connection contacts connected to said two highly-doped zones.

2. A symmetrical temperature sensor as claimed in claim 1, characterized in that the semiconductor body is sealed with the connection contacts into a glass envelope.

3. A symmetrical temperature sensor as claimed in claim 1, wherein the area of said two zones is less than the area of said surfaces of the semiconductor body.

* * * * *